No. 820,485. PATENTED MAY 15, 1906.
B. E. ELDRED.
PROCESS OF PRODUCING GAS.
APPLICATION FILED MAY 11, 1905.
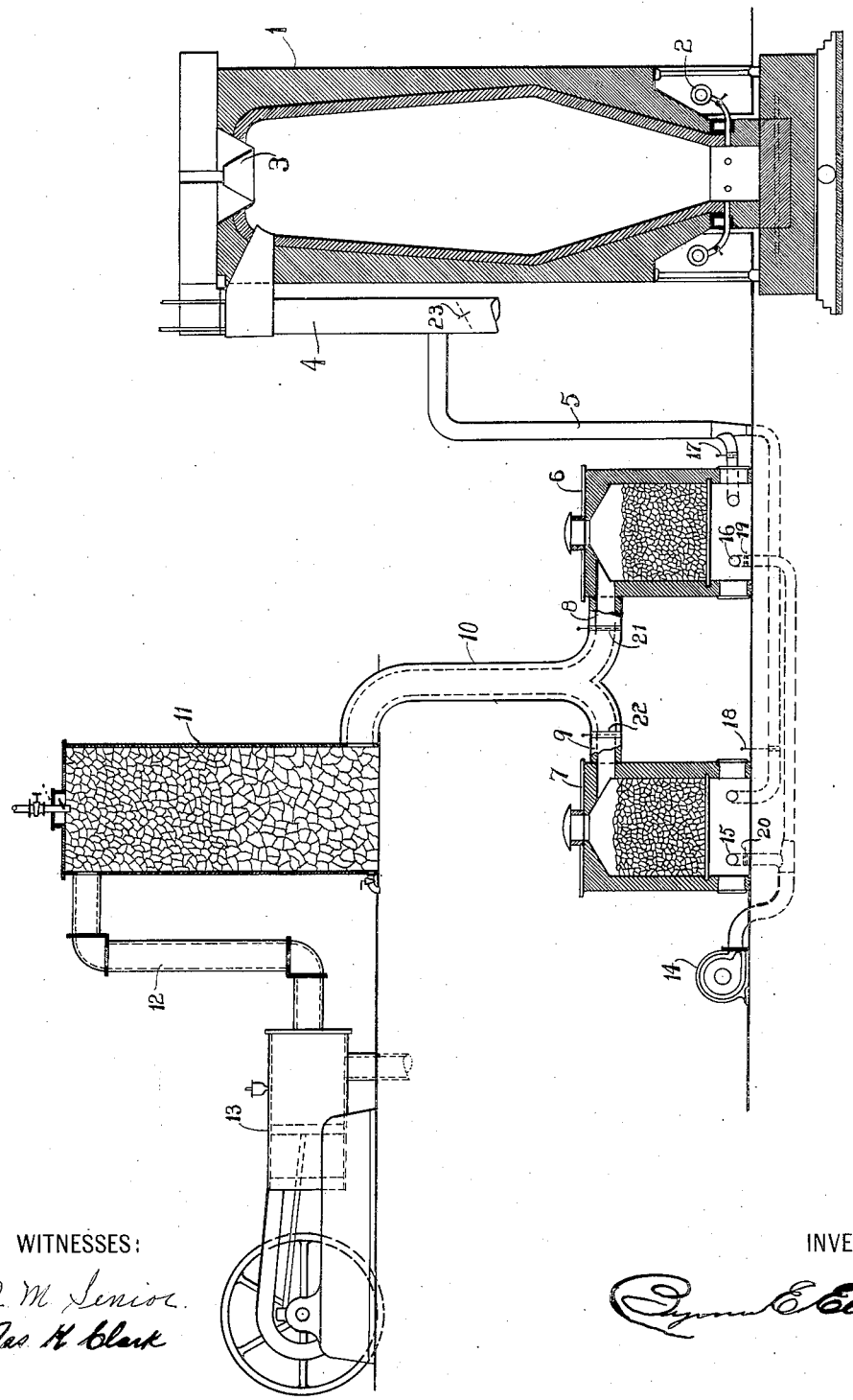
WITNESSES:
A. M. Senior.
Jas. H. Clark
INVENTOR
Byron E. Eldred

UNITED STATES PATENT OFFICE.

BYRON E. ELDRED, OF NEW YORK, N. Y., ASSIGNOR TO COMBUSTION UTILITIES COMPANY, OF NEW YORK, N. Y., A CORPORATION OF NEW YORK.

PROCESS OF PRODUCING GAS.

No. 820,485.     Specification of Letters Patent.     Patented May 15, 1906.

Application filed May 11, 1905. Serial No. 259,939.

*To all whom it may concern:*

Be it known that I, BYRON E. ELDRED, a citizen of the United States, and a resident of New York city, in the county of New York and State of New York, have invented certain new and useful Improvements in Processes of Producing Gas, of which the following is a specification.

This invention relates to methods for the production of gas of high calorific value containing only small amounts of hydrogen, and has for its object the manufacture of a gas which is especially suited for the operation of gas-engines.

In the operation of internal-explosion engines it has repeatedly been found that hydrogen is an objectionable element in the gas, owing to the tendency of back-firing or premature ignition, hydrogen being ignited by compression very easily.

My present invention has to do particularly with cupola or blast furnaces—such, for instance, as those used in the manufacture of pig-iron. As is well known, the gases from these furnaces contain a large amount of combustible matter, and it has therefore been repeatedly proposed to make use of these gases for power purposes. It has been found, however, that the thermal value of the gas or the proportion of combustible matter present is so small that gas-engines of abnormal size have to be employed, and because of this feature up to the present time none of the methods proposed have been brought to a commercial success.

The gases of a blast-furnace consist, essentially, of carbon dioxid, carbon monoxid, and nitrogen, the proportions increasing in the order named. Blast-furnace gas will average perhaps twelve per cent. carbon dioxid, twenty-five per cent. carbon monoxid, and the balance nitrogen. The presence particularly of carbon dioxid is objectionable in the use of power-gas purposes, and its conversion to carbon monoxid offers possibilities of great commercial importance.

My invention has particularly for its object the treatment of these blast-furnace gases in such a manner that the carbon dioxid contained is converted to carbon monoxid, and a combustible gas of high calorific value, well suited for power purposes, is secured. For this purpose I withdraw from the blast-furnace the aforesaid gases or take them from the stoves in which these gases may be burned to generate heat for preheating the air used at the twyers of the cupola, and I pass the aforesaid gases through a mass of highly-heated or incandescent coal or carbon or other fuel to bring about the reduction above mentioned. Inasmuch as the change to carbon monoxid is associated with the absorption of heat, for the reaction is an endothermic one, the reacting mass of fuel is gradually reduced in temperature, and the point is reached in this operation at which reduction of the blast-furnace gases takes place only incompletely. When this condition is reached, I cease blowing the fuel mass with the cupola-gases and inject in its place a blast of fresh air to revivify the fire and bring it again to a state of incandescence. At the same time by having two or more regenerators or reducing-chambers in operation I can bring about the continuous reduction of the cupola-gas, for while one generator is receiving the cupola-gases another generator may be raised in temperature by the introduction of fresh air. By so passing the carbon dioxid through the fuel and securing thereby a fairly complete reduction of the carbon dioxid to carbon monoxid, a gas having a relatively large number of heat-units per cubic foot is secured. For instance, while the gas of the above-mentioned composition will have a thermal value of about 60 B. T. U., by my process a gas of fully twice this thermal value is secured, making possible the use of gas-engines of very small dimensions.

Referring to the accompanying diagrammatic drawings, 1 illustrates a section of a cupola-furnace having the twyers 2, the hopper 3, and the downtake 4. From this downtake a conduit 5 leads to the generators 6 and 7. These generators have the outlets 8 and 9, delivering into the conduit 10. The latter leads to a scrubber 11, from which a pipe 12 establishes connection with the gas-engine 13. 14 is a fan-blower which enables pure air to be blown into the producers at 15 and 16. A series of blast gates or dampers 17, 18, 19, 20, 21, 22, and 23 serve to control the flow of the gases used in this apparatus.

My method of operation is as follows: Gases from the cupola 1 are introduced into the generator 6, which has been brought to a state of vivid incandescence prior to the introduction of aforesaid gases. This is accomplished by opening the gates 17 and 21, the gates 18 and 22 being closed. At the same time the generator 7 is brought to the temperature required for the cupola-gas "blow" by the introduction of fresh air at 15 by opening the gate 20. The products of cupola-gas blow on leaving the chamber pass into the conduit 10, to the scrubber 11, and thence to the gas-engine 13. The products of the air-blow in generator 7 may be allowed to go to waste in the air through the hopper in the upper part of generator, or they may be utilized in other ways for heating purposes, as for heating the generator-air and the like. It is also possible to pass the products of the air-blow into another chamber and reduce thereby the free or combined oxygen to carbid monoxid and produce a combustible gas suitable for some purposes. When the operation as above described has gone on for a suitable length of time, depending on the rapidity of the fall of temperature in the generator 6, the flow of gases is changed, and generator 7 is now used as the gasifying-chamber, while generator 6 is revivified. At this period of operation the gates 18 and 22 are open, while 19 and 20 are closed.

If desired, a gas-holder or gasometer may be placed in the conduit 10 or 12. A suitable cooler may be also placed in the conduit 12, where desired. This cooler may also function as a vaporizer, permitting of the introduction into the regenerators of water, vapor, or steam in such amounts as may prove permissible in gas-engine operation. If the gas is to be used for other purposes, larger amounts of water-vapor may be employed. For gas-engine purposes anthracite coal or coke is best for use in the generators. For other purposes—as, for instance, those applications which ordinarily employ producer-gas—this system of gas production by the employment of bituminous coal creates a gas enormously superior to ordinary producer-gas.

I do not limit myself to the number of generators nor to the exact method of their arrangement or distribution. Neither do I limit myself to any precise constructional details, as these form no part of the said process. It is possible to arrange updraft or downdraft producers in batteries and to make connections thereto from the cupola or from the stoves in which the cupola-gas is burned in such a way that the cupola-gas from the stove or elsewhere may be introduced alternately or intermittently into the generators in such a way as to produce large quantities of combustible gas at very little expense for fuel.

Owing to the small amount of nitrogen which a cupola-furnace waste gas contains compared with the ordinary products of combustion, it is necessary to conduct the operation of gasification so that this small amount of nitrogen is properly allowed for, for the reason that reduction in the amount of nitrogen usually means the possibility of reduction in the amount of carbon dioxid in the producer-gas to a considerable degree. The nitrogen, furthermore, being substantially an inert element, inasmuch as it is neither a supporter of combustion nor a combustible, it follows that reduction in the amount of this element leads to a reduction in the amount of sensible heat carried away by the inert portion of the gas. Since for gas-engine work the sensible heat of the gas is practically all wasted, it is desirable to make this loss as low as possible. The same consideration applies as well to regenerative furnaces of the reversing type, where the sensible heat of the producer-gas is entirely lost.

What I claim is—

1. The process of producing gas which consists in transmitting unmixed blast-furnace gases through a deep bed of incandescent fuel and collecting the resultant gas.

2. The process of manufacturing gas which consists in alternately blasting a deep bed of hot fuel with air and with waste gases from a blast-furnace and in collecting for use the gas from the latter operation.

3. The process of manufacturing and using gas which consists in alternately blasting a deep bed of hot fuel with air and with waste gases from a blast-furnace, in collecting the gas from the latter operation, purifying the same and delivering to a gas-engine.

4. The process of manufacturing and using gas which consists in alternately blasting a deep bed of hot fuel with air and with waste gases from a blast-furnace, in collecting the gas from the latter operation, cooling and washing the same and delivering to a gas-engine.

Signed at New York city, in the county of New York and State of New York, May, A. D. 1905.

BYRON E. ELDRED.

Witnesses:
JAS. K. CLARK,
A. M. SENIOR.